(12) United States Patent
Gauthier et al.

(10) Patent No.: US 7,865,481 B2
(45) Date of Patent: Jan. 4, 2011

(54) CHANGING DOCUMENTS TO INCLUDE CHANGES MADE TO SCHEMAS

(75) Inventors: Charles S. Gauthier, Rochester, MN (US); David Gerard Herbeck, Rochester, MN (US); John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 11/427,386

(22) Filed: Jun. 29, 2006

(65) Prior Publication Data

US 2008/0005182 A1 Jan. 3, 2008

(51) Int. Cl.
G06F 7/00 (2006.01)
G06F 17/00 (2006.01)
(52) U.S. Cl. .................. 707/694; 705/35; 705/80
(58) Field of Classification Search ............. 707/1–100; 705/1–100
See application file for complete search history.

(56) References Cited

U.S. PATENT DOCUMENTS

2002/0165745 A1* 11/2002 Greene et al. ............. 705/7
2005/0091576 A1* 4/2005 Relyea et al. ............. 715/502
2006/0235715 A1* 10/2006 Abrams et al. ............. 705/1

* cited by examiner

*Primary Examiner*—Hosain T Alam
*Assistant Examiner*—Navneet K Ahluwalia
(74) *Attorney, Agent, or Firm*—Gwen J. Gamon; Grant A. Johnson

(57) ABSTRACT

In an embodiment, an upgrade rule associated with a configuration set is found, and a document associated with the upgrade rule is found. The configuration set includes a schema and an upgrade transformation, and the upgrade transformation specifies a change that was made to the schema. The document includes a lifecycle state and an element. If the upgrade rule indicates an automatic upgrade, then a mutability rule associated with the lifecycle state of the document is found and a decision is made whether the mutability rule allows the document to be changed. If the mutability rule allows the document to be changed, the element in the document is changed to include the change specified by the upgrade transformation at a time specified by the upgrade rule. If the mutability rule prevents the document from being changed, a new document is created with an initial lifecycle state, the document is copied to new document, and the element is changed in the new document to include the change specified by the upgrade transformation.

20 Claims, 7 Drawing Sheets

| DOCUMENT TYPE DEFINITIONS | | | | | 162 |
|---|---|---|---|---|---|
| DOCUMENT TYPE DEF ID (325) | LINK TO LIFECYCLE DEFINITION (330) | LINK TO CONFIG SET (335) | ATTRIBUTES (340) | UPGRADE RULES (345) | |
| DOCUMENT TYPE DEF A | LIFECYCLE DEFINITION A | CONFIG SET A | NAME (CHAR), ADDRESS, LIFECYCLE STATE, PARTIAL UPGRADE (YES/NO) | PERFORM AUTO UPGRADE AT PROMOTION | 305 |
| DOCUMENT TYPE DEF F | LIFECYCLE DEFINITION E | CONFIG SET C | | PERFORM AUTO UPGRADE AT FIRST DOCUMENT ACCESS AFTER PROMOTION | 310 |
| DOCUMENT TYPE DEF B | LIFECYCLE DEFINITION H | CONFIG SET B | | SET ATTRIBUTE INDICATING PARTIAL AUTO UPGRADE AND REFERENCE ERROR LOG | 315 |
| DOCUMENT TYPE DEF Z | LIFECYCLE DEFINITION M | CONFIG SET D | | NOTIFY CLIENT THAT MANUAL UPDATE NEEDED | 320 |

FIG. 3

| LIFE CYCLE DEFINITION A | | 174 |
|---|---|---|
| LIFECYCLE STATE 525 | MUTABILITY RULE 530 | |
| DRAFT | ALL DOCUMENT CONTENT AND ALL ATTRIBUTES ARE MUTABLE | 505 |
| REVIEWED | ALL DOCUMENT CONTENT AND A SUBSET OF ATTRIBUTES ARE MUTABLE | 510 |
| APPROVED | ALL DOCUMENT CONTENT AND A SUBSET OF ATTRIBUTES ARE MUTABLE | 515 |
| EFFECTIVE | ALL DOCUMENT CONTENT AND ALL ATTRIBUTES ARE IMMUTABLE | 520 |

FIG. 5

CHANGING DOCUMENTS TO INCLUDE CHANGES MADE TO SCHEMAS

FIELD

An embodiment of the invention generally relates to computer systems and more specifically relates to managing changes to schemas.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

One use of computer systems is in products that use XML (Extensible Markup Language) documents. XML documents are often created according to a particular structure defined by a Document Type Definition (DTD) or an XML schema. An XML document is valid if it adheres to the rules of its associated DTD or schemas. XML-aware content management systems (CMS) such as Documentum or IBM Solution for Compliance in a Regulated Environment (SCORE) provide services to manage and validate XML document instances in a content repository.

To ensure validity of the document content, a content management system maintains an association between a document instance and its schemas and performs validity checking before moving the document content into the content repository. But, when a schema changes, the document instances (of which thousands may exist) that reference the schema may become invalid, depending on whether the schema change is a compatible schema change or an incompatible schema change. A compatible schema change is one in which the schema is backward compatible with existing document instances (e.g. a new optional element is added to the schema). In this case, the existing document instances will remain valid with no required changes. An incompatible schema change is one in which the schema is not backward compatible (e.g., a new required element is added to the schema). In this case, the existing document instances that reference the changed schema become invalid, unless they are updated to conform to the new schema changes. Current content management systems experience difficulty in finding all of the document instances that reference the updated schema, determining the change that was made to the schema that caused the updated schema to be incompatible with the document instances, and modifying the document instances to comply with the updated schema.

The problem of incompatible schema changes becomes even more daunting in a regulated environment that can have several document lifecycle states. For example, document versions may be in a "draft" state, a "reviewed" state, and an "approved" state, where some document versions are allowed to change to conform to an incompatible schema change and some document versions are not allowed to change to conform to an incompatible schema change. For example, typically if a document instance is in an "approved" state in a regulated environment, the document can no longer be changed to conform to an incompatible schema change.

Thus, a better technique is needed for handling changes to schemas.

SUMMARY

A method, apparatus, system, and signal-bearing medium are provided. In an embodiment, an upgrade rule associated with a configuration set is found, and a document associated with the upgrade rule is found. The configuration set includes a schema and an upgrade transformation, and the upgrade transformation specifies a change that was made to the schema. The document includes a lifecycle state and an element. If the upgrade rule indicates an automatic upgrade, then a mutability rule associated with the lifecycle state of the document is found and a decision is made whether the mutability rule allows the document to be changed. If the mutability rule allows the document to be changed, the element in the document is changed to include the change specified by the upgrade transformation at a time specified by the upgrade rule. If the mutability rule prevents the document from being changed, a new document is created with an initial lifecycle state, the document is copied to new document, and the element is changed in the new document to include the change specified by the upgrade transformation. If the upgrade rule indicates a manual upgrade, a message is sent to a client that sent a promote action, and the message includes an instruction to manually change the element in the document. In this way, documents may be upgraded to include changes made to schemas.

BRIEF DESCRIPTION OF THE DRAWINGS

Various embodiments of the present invention are hereinafter described in conjunction with the appended drawings:

FIG. 3 depicts a block diagram of an example data structure for a document type definition, according to an embodiment of the invention.

FIG. 5 depicts a block diagram of an example data structure for a lifecycle definition, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

An embodiment of the invention provides a lifecycle for managing changes to configurations sets in support of instances of documents, themselves of which are being driven through a lifecycle within a content management system. In an embodiment, the configuration set changes are implemented into the document instances automatically based on upgrade rules in response to a "promotion" action, which deploys a pending configuration change into the operational environment of the content management system.

The upgrade rules are included within a document type definition and specify whether or not the configuration set changes should be:

(1) performed automatically; and (2) when such automated upgrades should be performed (e.g. at such time that a configuration set change is promoted, or at such time that a document instance is accessed after the configuration set change is available in the operational environment.

Another aspect of an embodiment of the invention is the specification of mutability rules on a state-by-state basis within a document lifecycle definition (e.g. changes are only allowed to document instances that are in the draft lifecycle state, and are not allowed to documents which are in reviewed, approved, or effective states). Another aspect of an embodiment of the invention creates new draft versions for those document instances that are in immutable (unchangeable) lifecycle states.

Figure 1:
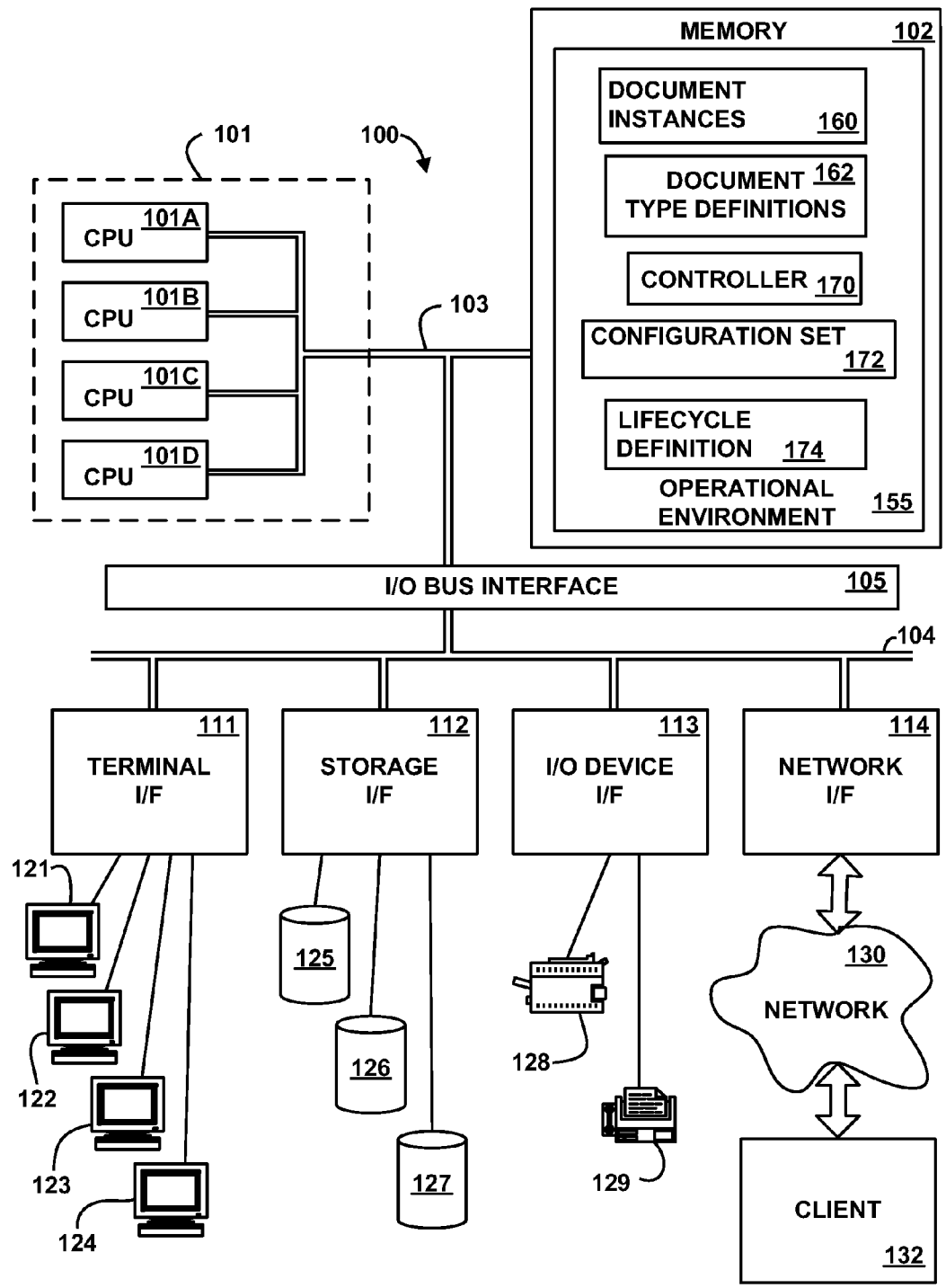
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "client" and "server" are used herein for convenience only, and in various embodiments a computer that operates as a client in one environment may operate as a server in another environment, and vice versa. In an embodiment, the hardware components of the computer systems 100 and/or 132 may be implemented by an eServer iSeries computer system available from International Business Machines of Armonk, N.Y. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 stores or encodes an operational environment 155, which includes document instances 160, document type definitions 162, a controller 170, a configuration set 172, and a lifecycle definition. Although the document instances 160, the document type definitions 162, the controller 170, the configuration set 172, and the lifecycle definition 174 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the document instances 160, the document type definitions 162, the controller 170, the configuration set 172, and the lifecycle definition 174 are illustrated as being contained within the main memory 102, these elements are not necessarily all completely contained in the same storage device at the same time. Further, although the document instances 160, the document type definitions 162, the controller 170, the configuration set 172, and the lifecycle definition 174 are illustrated as being separate entities, in other embodiments some of them, or portions of some of them, may be packaged together.

The document instances 160 include data that is encoded using a markup language. In an embodiment, the document instances 160 are encoded using XML, but in other embodiments any appropriate markup language may be used. Each document instance 160 is linked to or associated with a document type definition 162, which links to an associated lifecycle definition 174 and the configuration set 172. The document instances 160 are further described below with reference to FIG. 2. The document type definition 162 includes rules for upgrading the document instance 160. The document type definition 162 defines the structure of a class or type of the document instances 160. The document type definitions 162 are further described below with reference to FIG. 3. The configuration set 172 is further described below with reference to FIG. 4. The lifecycle definition 174 is further described below with reference to FIG. 5.

The controller 170 upgrades the document instances 160 to make them compatible with and to include the changes to the configuration set 172. In an embodiment, the controller 170 includes instructions capable of executing on the processor 101 or statements capable of being interpreted by instructions executing on the processor 101 to perform the functions as further described below with reference to FIGS. 6 and 7. In another embodiment, the controller 170 may be implemented in microcode. In another embodiment, the controller 170 may be implemented in hardware via logic gates and/or other appropriate hardware techniques.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interface) bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The client computer system 132 may include some or all of the hardware and/or software elements previously described above for the server computer system 100. The client computer system 132 sends a promote request to the controller 170. In another embodiment, the client 132 may be implemented as a component of the server computer system 100, e.g., via a software program in the memory 102.

It should be understood that FIG. 1 is intended to depict the representative major components of the server computer system 100, the network 130, and the client computer system 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the server computer system 100, and that, when read and executed by one or more processors 101 in the server computer system 100, cause the server computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the server computer system 100 via a variety of tangible signal-bearing media that may be operatively or communicatively connected (directly or indirectly) to the processor 101. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), CD-RW, or diskette; or (3) information conveyed to the computer system 100 by a communications medium, such as through a computer or a telephone network, e.g., the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
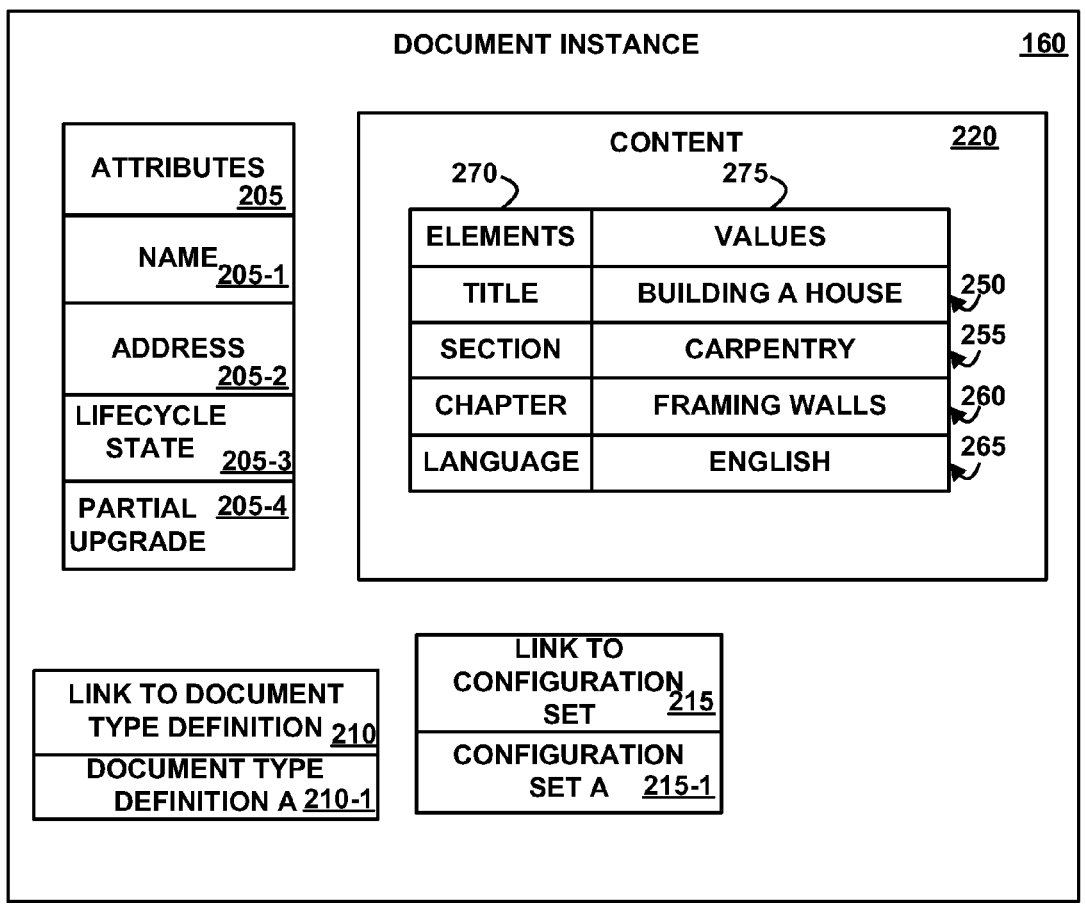
FIG. 2 depicts a block diagram of an example data structure for a document instance, according to an embodiment of the invention.

FIG. 2 depicts a block diagram of an example data structure for a document instance 160, according to an embodiment of the invention. The document instance 160 includes text or other data, interspersed with markup (or control tags) that indicates the information's separation into a hierarchy of character data, container-like elements, and attributes of those elements. In an embodiment, the document instance 160 is encoded according to XML (Extensible Markup Language), but in other embodiments any appropriate markup language may be used. A markup language is a type of language that describes a document's formatting. A markup language, such as XML is formally defined, allowing programs to modify and validate documents in these languages without prior knowledge of their form. More specifically, the example document instance 160 includes attributes 205, content 220, a link 210 to a document type definition 162 associated with the document instance 160, and a link 215 to a configuration set 172 associated with the document instance 160.

Examples of the attributes 205 include a name 205-1, an address 205-2, a lifecycle state 205-3, and partial upgrade 205-4. The name 205-1 and the address 205-2 may be the name and address of the author, editor, or creator of the document instance 160. The lifecycle state 205-3 indicates the state of the document instance 160 within a lifecycle. Example lifecycle states 205-3 include a draft state (the initial lifecycle state), a reviewed state, and approved state, and an effective state (the final lifecycles state), but in other embodiments any appropriate lifecycle states may be used. The document instance 160 moves through the various lifecycle states (from the initial lifecycle state to the final lifecycle state by the controller 170 changing the lifecycle state 205-3) during the lifecycle of the document instance 160 as the content 220 of the document instance 160 is edited. The various lifecycle states 205-3 and the movement of the document instance 160 between the lifecycle states 205-3 as the content 220 of the document instance 160 is changed, modified, amended, or edited constitutes the lifecycle of the document instance 160. The partial upgrade attribute 205-4 indicates whether or not the document instance 160 has been partially upgraded to be compatible with changes that have occurred in the configuration set 172.

The content includes any number of records 250, 255, 260, and 265, each of which includes an element field 270 and a value field 275. The element field 270 includes a markup element or a control tag that separates the values 275 of the content 220 into a hierarchy relationship and specifies the format of the values 275. The value field 275 includes the textual characters or other data (such as video, audio, or graphics) that is displayed or presented in the format specified by the elements 270 when the document instance 160 is rendered, e.g., for display on the terminals 121, 122, 123, or 124.

The link 210 to a document type definition 162 identifies, includes an address of, or points to a document type definition 162. The example link 210-1 identifies one of the records in the document type definitions 162, as further described below with reference to FIG. 3. The link 215 to a configuration set 172 identifies, includes an address of, or points to a configuration set 172. The example link 215-1 identifies the configuration set 172, as further described below with reference to FIG. 4.

FIG. 3 depicts a block diagram of an example data structure for a document type definition 162, according to an embodiment of the invention. A document type definition 162 defines the structure of a class or type of the document instances 160. The document type definitions 162 include example records 305, 310, 315, and 320. Each of the records 305, 310, 315, and 320 is an example document type definition 162, and any number of the document instances 160 may link to, reference, or be associated with a single document type definition 162 represented by one of the records. For example, the document instance 160 in FIG. 2 links to the record 305 via the link 210. Each of the records 305, 310, 315, and 320 includes a document type definition identifier 325, a link 330 to a lifecycle definition 174, a link to a configuration set 335, attributes 340, and upgrade rules 345.

The document type definition identifier 325 identifies the document type definition, i.e., the document type definition identifier 325 identifies its respective record. The link 330 to a lifecycle definition 174 identifies, points to, or contains the address of an associated lifecycle definition. For example, the link 330 in the record 305 identifies the lifecycle definition 174, as further described below with reference to FIG. 5. The link 335 to a configuration set 172 identifies, points to, or contains the address of an associated configuration set 172. For example, the link 335 in the record 305 identifies the configuration set 172 as further described below with reference to FIG. 4.

The attributes 340 name the allowable set of attributes 205 (FIG. 2) that the document instance 160 may contain, including the type for each attribute value and an optional explicit set of valid values for each attribute. For example, the attributes 340 in the record 305 names the allowable set of attributes 205 (FIG. 2) as name, address, lifecycle state, and partial upgrade, corresponding to the name attribute 205-1, the address attribute 205-2, the lifecycle state attribute 205-3, and the partial upgrade attribute 205-4. The attributes 340 further indicates the type of the name attribute 205-1 as character and indicates the set of valid values for the partial upgrade attribute 205-4 as yes or no, indicating whether or not the document instance 160 has been partially upgraded to conform to a change to the configuration set 172 that is identified by the link 335.

The upgrade rules 345 specify whether or not to automatically upgrade the document instances 160 that link to the document type definition 162, to make the document instances 160 be compatible with changes that have occurred to the configuration set 172. The upgrade rules 345 further specify the time for performing the automatic upgrade if any, and any other actions that are to be taken in response to a promotion action of the changes to the configuration set 172. The upgrade rules 345 may further specify a portion of the changes that are to be made to the document instances. Since the document type definition 162 contains the link 335 to the configuration set 172, the upgrade rules 345 are associated with the configuration set 172. Since the document 160 includes a link 210 (FIG. 2) to the document type definition 162, the document 160 is associated with the upgrade rules 345.

As an example, the upgrade rules 345 in the document type definition record 305 specify that the document instances 160 that link to the document type definition record should be automatically upgraded to be compatible with and include changes that have occurred to the linked configuration set 172, at the time that the linked configuration set 172 is promoted to the operational environment 155.

As another example, the upgrade rules 345 in the document type definition record 310 specify that the document instances 160 that link to the document type definition record should be automatically upgraded to be compatible with and include changes that have occurred to the linked configuration set, at the time of the first access of the document instance 160 following the promotion of the linked configuration set 172 into the operational environment 155.

As another example, the upgrade rules 345 in the document type definition record 315 specify that the document instances 160 that link to the document type definition record should be automatically upgraded to be compatible with only a portion of the changes that have occurred to the linked configuration set and the partial upgrade indicator 205-4 should be set and an entry to an error log should be written. The upgrade rules 345 in the record 315 may specify the portion of the changes that should be upgraded to the documents 160, such as by the upgrade rules 345 specifying particular element names that are allowed to (or disallowed to be changes), by specifying that certain types of changes are allowed to be made to the document instances 160 (e.g. an addition of an optional element), but that other types of changes (e.g., an addition of a required element) are not to be made to the document instances 160.

As another example, the upgrade rules 345 in the document type definition record 320 specify that the document instances 160 that link to the document type definition record should not be automatically upgraded, but instead the client 132 that sent the promotion action should be notified that the document instances 160 that link to the document type definition record need to be to be manually updated to conform to or include the changes to the linked configuration set 172 that is being promoted into the operational environment 155.

The phrase "operational environment," as used herein, refers to the particular data structures (the particular document instances 160, the document type definitions 162, the lifecycle definitions 174, and the configuration set) that the controller 170 uses when operating or executing. That is, a promote action, which specifies a configuration set 172 that has been changed, requests the controller 170 to access and use the identified configuration set 172 (containing the changes) when interpreting and rendering the document instances 160 for presentation or display, as opposed to a previous version of the configuration set 172. Thus, once the changed configuration set has been promoted into the operational environment 155, the controller 170 begins using those changes.

Figure 4:
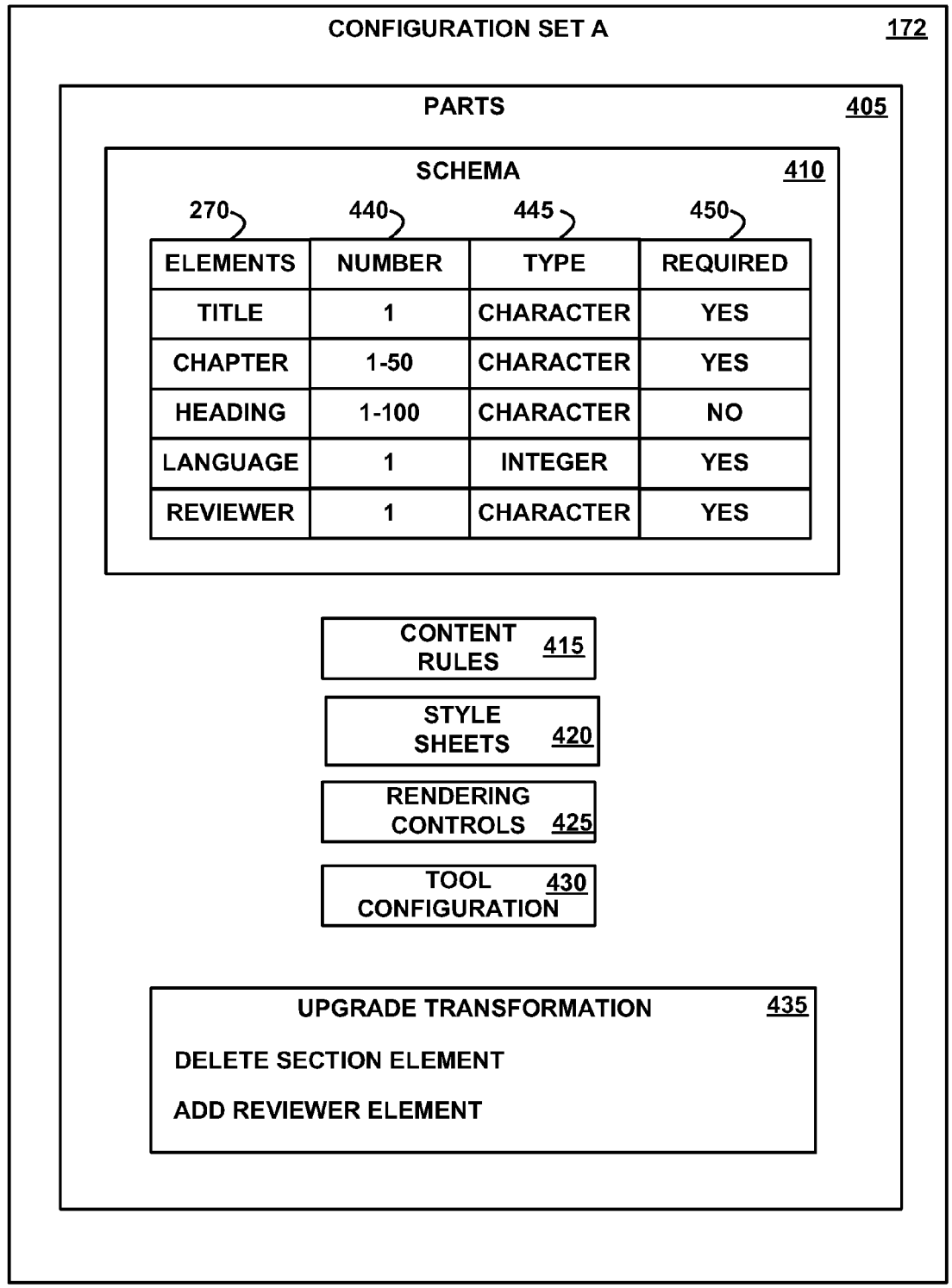
FIG. 4 depicts a block diagram of an example data structure for a configuration set, according to an embodiment of the invention.

FIG. 4 depicts a block diagram of an example data structure for an example configuration set 172, according to an embodiment of the invention. The configuration set 172 includes parts 405, which include a schema 410, content rules 415, style sheets 420, rendering controls 425, tool configurations 430, and an upgrade transformation 435.

The schema 410 is a description of a type of the document instance 160. That is, the schema 160 describes the constraints on the structure, format, and content of the document instances 160 that have that type, meaning they link to the schema, either directly or indirectly via their associated document type definition 162. The schema 410 restricts the element names 270 and/or attribute names in the document instances 160 and their allowable containment hierarchies, such as restricting the chapter element to include only a certain number 440 of elements named "heading." The constraints in the schema 410 may also include data type 445 assignments that affect how information is processed; for example, the "chapter" element's character data may be defined as being a chapter according to a particular schema language's conventions, perhaps meaning that it must not only be formatted a certain way, but also must not be processed as if it were some other type of data. The process of checking to see if a document instance 160 conforms to its associated schema 410 is called validation, and document instances 160 are valid if they satisfy the requirements of their associated schema 410. The controller 170 uses the schema to interpret and render the elements 270 and values 275 in the document 160 for presentation or display.

More particularly, the schema 410 includes any number of records, each of which includes an example element field 270, a number field 440, a type field 445, and a required field 450, although more or fewer fields may be present. The elements 270, the number 440, the type 445, and the required field 450 are all examples of how the schema 410 describes the format, structure, and content of the document 160.

The elements field 270 names the allowable set of elements that the document instance 160 may contain. The number field 440 indicates the number of the elements that may be present. The type field 445 includes the type (e.g., character, integer, floating point, etc.) of data values 275 that each respective element 270 contains, i.e., how the storage location that contains the data value is interpreted. The required field 450 is an indication of whether or not the element 270 is required to be present or is optional in the document instance 160.

The content rules 415 may specify such content as bursting, linking, and metadata synchronization for the document instance 160.

The style sheets 420 are implemented in a style sheet language, which is a computer language used to describe the style or presentation of elements in the document instance 160. In an embodiment, the style sheets 420 are implemented as Cascading Style Sheets (CSS) or XSLT (Extensible Style sheet Language Transformations), but in other embodiments any appropriate style sheet language may be used. The style sheets 420 define colors, fonts, layout, and other aspects of document presentation for the document instance 160. The style sheets 420 may also allow the same document instance 160 to be presented in different styles for different rendering methods, such as on-screen, in print, by voice (when read out by a speech-based browser or screen reader) and on Braille-based, tactile devices.

Style sheet information can be provided by various sources, such as an author style, a user style, and a user agent style. An author style is style information provided by a web page author, and may be in the form of external style sheets (e.g., a separate style sheet referenced from the document instance 160), an embedded style (blocks of style sheet information inside the document instance 160 itself) and inline styles (inside the document instance 160, specified, e.g., using a "style" attribute). A user style is a local style sheet file specified by the client 132, e.g., via options in a web browser at the client 132, and acting as an override, to be applied to all of the document instances 160. A user agent style is the default style sheet applied by the client 132, e.g. the browser's default presentation of elements.

In various embodiments, the rendering controls 425 may be implemented as XSLT (Extensible Style sheet Language Transformations) or XSL-FO (XSL Formatting Objects), which is an XML markup language for document formatting, or any other appropriate rendering control protocols. XSL-FO is a language that can be used to specify physical layout, coloring, typography, etc, of XML documents for screen, print, and other media. XSLT, is an XML-based language used for the transformation of XML documents. The original document 160 is not changed; rather, a new document is created based on the content of the existing document 160. The new document may be serialized (output) by the controller 170 in standard XML syntax or in another format, such as HTML (Hypertext Markup Language) or plain text.

The tool configurations 430 identifies third-party tools, plug-ins, or APIs (Application Program Interfaces) that when invoked provide formatting for the document instances 160.

The upgrade transformation 435 specifies the changes that have been made to the schema 410. For example, the upgrade transformation 435 includes sample changes of deleting the section element and adding the reviewer element. In another embodiment, the upgrade transformation 435 may include modifying an element, for example changing the number 440, type 445, or required 450 values for an existing element. The controller 170 uses the upgrade transformation 435 to make corresponding changes to the document instances 160.

FIG. 5 depicts a block diagram of an example data structure for a lifecycle definition 174, according to an embodiment of the invention. The lifecycle definition 174 includes example records 505, 510, 515, and 520, each of which includes a lifecycle state field 525 and a mutability rule field 530. The lifecycle state field 525 specifies the valid values of the lifecycle state 205-3 in the document instance 160. The mutability rule field 530 specifies whether the document instance 160 may be modified while the document instance 160 is in the corresponding lifecycle state 525 (has a lifecycle state 205-3 that equals the value in the lifecycle state 525) and the portions of the document instance 160 that may be modified.

For example, the record 505 specifies that while the document instance 160 contains a lifecycle state 205-3 of "draft," all of the document content 220 and all attributes 205 are mutable (capable of being changed). The record 510 specifies that while the document instance 160 contains a lifecycle state 205-3 of "reviewed," all of the document content 220 and a subset of the attributes 205 are mutable. The record 515 specifies that while the document instance 160 has a lifecycle state 205-3 of "approved," all of the document content 220 and a subset of the attributes 205 are mutable. The record 520 specifies that while the document instance 160 has a lifecycle state 205-3 of "effective," all of the document content 220 and a subset of the attributes 205 are immutable (not permitted to be changed).

Figure 6:
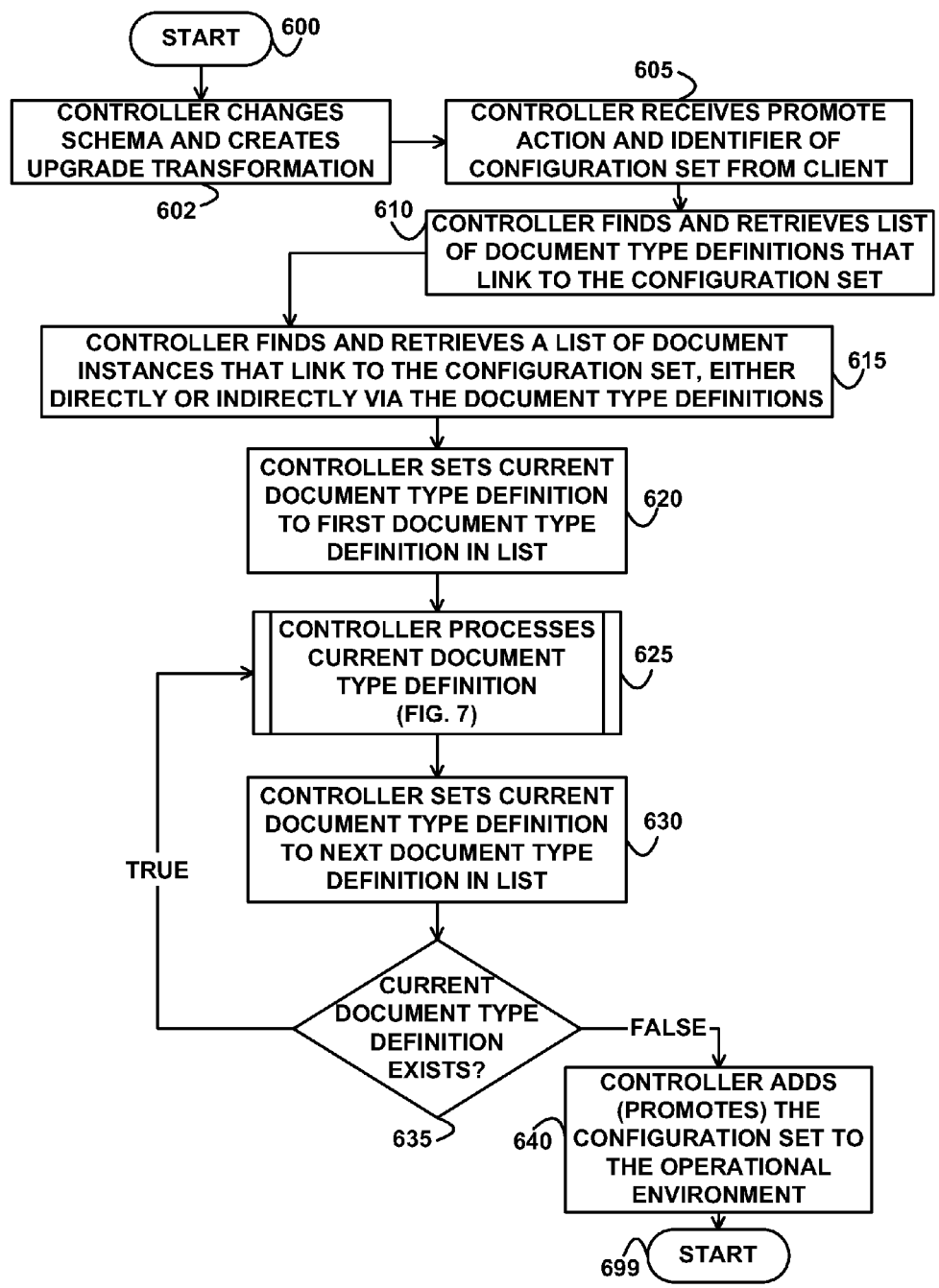
FIG. 6 depicts a flowchart of example processing for promoting changes, according to an embodiment of the invention.

FIG. 6 depicts a flowchart of example processing for promoting changes to the configuration set 172, according to an embodiment of the invention. Control begins at block 600. Control then continues to block 602 where the controller 170 changes the schema 410 in response to a request from a user interface. The controller 170 further creates the upgrade transformation 435 that describes the changes to the schema 410 and identifies the elements 270 that are changed.

Control then continues to block 605 where the controller 170 receives a promote action and an identifier of a configuration set 172 from the client computer system 132. The promote action requests the deployment of the identified configuration set 172 into the operational environment 155 of the controller 170, the document instances 160, the document type definitions 162, and the lifecycle definitions 174. That is, the promote action requests the controller 170 to access and use the identified configuration set 172 when interpreting and rendering the document instances 160 for presentation or display, as opposed to a previous version of the configuration set 172.

Control then continues to block 610 where the controller 170 finds and retrieves a list of document type definitions 162 that link to the received configuration set 172 via the link 335 to the configuration set 172 in the document type definitions 162. Control then continues to block 615 where the controller 170 finds and retrieves a list of the document instances 160 that link to the configuration set 172, either directly via the link 215 to the configuration set 172 in the document instances 160 or indirectly via the link 210 to the document type definitions 162 and the link 335 to the configuration set 172 in the linked document type definition 162.

Control then continues to block 620 where the controller 170 sets the current document type definition to be the first document type definition in the list previously created. Control then continues to block 625 where the controller 170 processes the current document type definition, as further described below with reference to FIG. 7. Control then continues to block 630 where the controller 170 sets the current document type definition to be the next document type definition in the list. Control then continues to block 635 where the controller 170 determines whether the current document type definition exists in the list.

If the determination at block 635 is true, then the current document type definition exits in the list, so control returns to block 625, where the controller 170 processes the current document type definition in the list, as previously described above.

If the determination at block 635 is false, then the current document type definition does not exist in the list and all document type definitions 162 have been processed by the logic of FIG. 6, so control continues to block 640 where the controller 170 adds (promotes) the configuration set 172 that was requested to be promoted via the received promotion action to the operational environment 155. Control then continues to block 699 where the logic of FIG. 6 returns.

Figure 7:
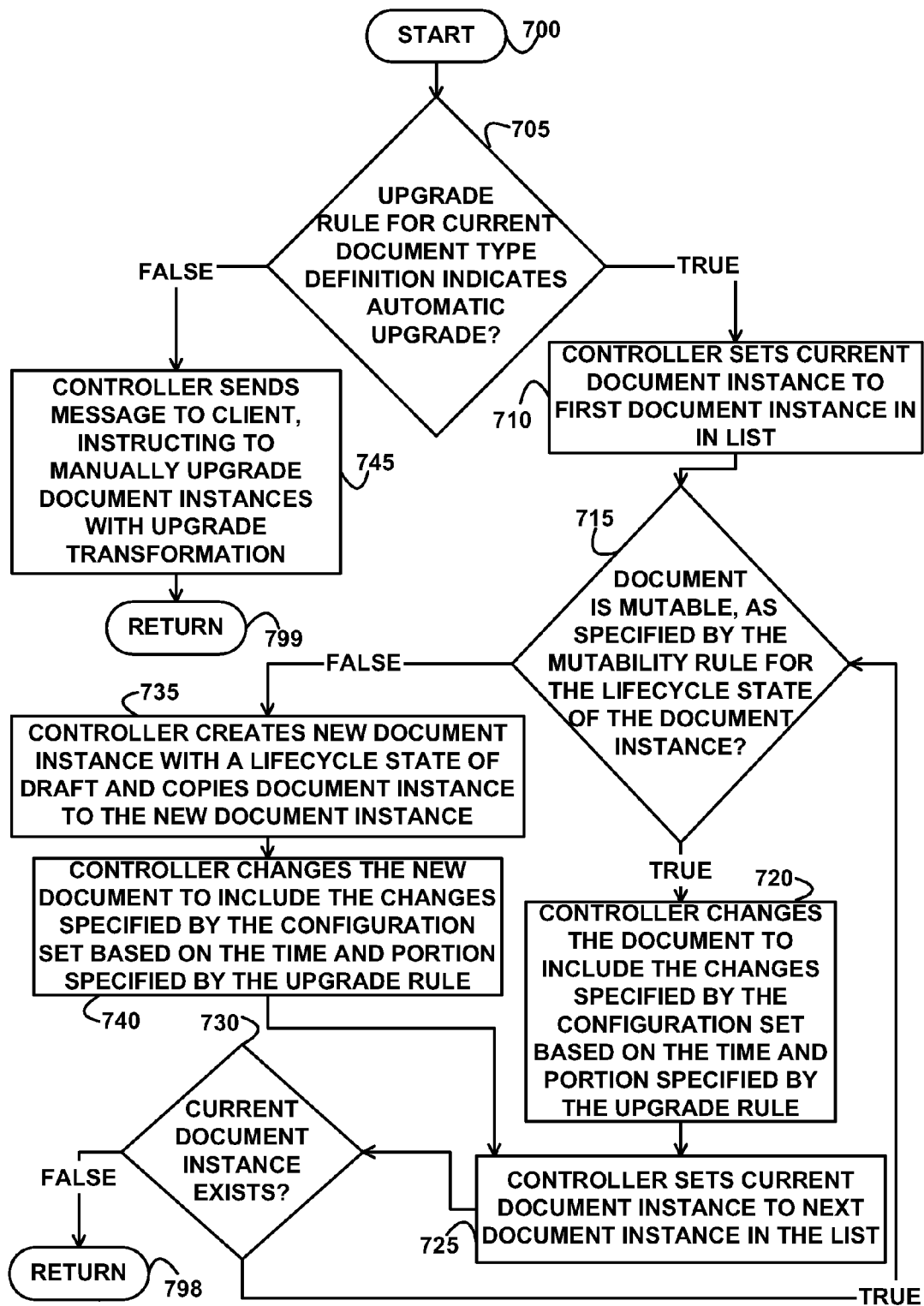
FIG. 7 depicts a flowchart of example processing for handling documents, according to an embodiment of the invention.

FIG. 7 depicts a flowchart of example processing for handling the documents 160, according to an embodiment of the invention. Control begins a block 700. Control then continues to block 705 where the controller 170 determines whether the upgrade rule 345 for the current document type definition indicates an automatic upgrade. For example, the records 305, 310, and 315 in the document type definition 162 have an upgrade rule 345 that indicates an automatic upgrade, but the record 320 has an upgrade rule 345 that indicates a manual upgrade.

If the determination at block 705 is true, then the upgrade rule 345 for the current document type definition indicates an automatic upgrade, so control continues to block 710 where the controller 170 sets the current document instance to be the first document instance 160 in the list. Control then continues to block 715 where the controller 170 determines whether the document is mutable (capable of being changed), as specified by the mutability rule 530 for the lifecycle state 205-3 in the current document instance 160 that matches the lifecycle state 525 in the lifecycle definition 174.

If the determination at block 715 is true, then the current document instance 160 is mutable, as specified by the mutability rule 530 for the lifecycle state 205-3 of the document instance 160, so control continues to block 720 where the controller 170 promotes the changes specified by the upgrade transformation 435 of the configuration set 172 to the current document instance 160 based on the time of upgrade and the portion of changes specified by the upgrade rule 345 associated with the current document instance 160. Since the schema 410 describes the format of the content 220 in the document 160, and the format specified by the schema 410 has changed (as described by the upgrade transformation 435), the controller 170 changes the format of the content 220 in the document 160 to be compatible with and include the changed format that is specified in the schema 410 by changing the element 270 in the content 220 as specified by the upgrade transformation 435.

For example, if the upgrade transformation 435 specifies than an element 270 has been added to the schema 410, then the controller 170 adds the element to the elements 270 in the document content 220, in order to make the document 160 compatible with the schema 410 that is being promoted to the operational environment 155. As another example, if the upgrade transformation 435 specifies than an element 270 has been deleted from the schema 410, the controller deletes that element 270 from the document content 220, in order to make the document 160 compatible with the schema 410 that is being promoted to the operational environment 155.

The controller 170 changes the document instance 160 at the time specified by the upgrade rule 345. For example, if the upgrade rule 345 specifies that the time to make the changes to the document instance is the time of promotion (e.g., the upgrade rule 345 in the record 305), the controller 170 makes the changes specified by the upgrade transformation 435 to the current document instance 160 at the time of the execution of the logic associated with block 720. As another example, if the upgrade rule 345 specifies that the time to make the changes to the document instance is at the first document access after the promotion, then the controller 170 makes the changes specified by the upgrade transformation 435 to the current document instance 160 at the time of the first access of the current document instance 160 after or following the time of the promotion of the configuration set 172 to the operational environment 155. The time of the promotion of the configuration set 172 to the operational environment 155 is the time of the execution of the logic of block 640 of FIG. 6, as previously described above.

Control then continues to block 725 where the controller 170 sets the current document instance to be the next document instance 160 in the list. Control then continues to block 730 where the controller 170 determines whether the current document instance exists in the list. If the determination at block 730 is true, then the current document exists in the list, so control returns to block 715, as previously described above.

If the determination at block 730 is false, then the current document instance does not exist in the list and all document instances 160 in the list have been processed by the logic of FIG. 7, so control continues to block 798 where the logic of FIG. 7 returns.

If the determination at block 715 is false, then the current document instance is immutable, and the mutability rule 530 for the lifecycle state 205-3 of the current document instance 160 prevents the current document instance 160 from being changed, so control continues to block 735 where the controller 170 creates a new document instance 160 with a lifecycle state 205-3 of and copies the current document instance to the new document instance. The draft lifecycle state is the initial (first) state in the lifecycle of the document. Control then continues to block 740 where the controller 170 promotes the changes that are specified by the upgrade transformation 435 of the configuration set 172 to the new document instance based on the upgrade rules 345. The controller 170 changes the new document instance to include the portion of the changes that is specified by the upgrade rule 345 and performs the changing of the new document at the time specified by the upgrade rule 345. The controller 170 changes the new document instance in a manner analogous to the changing the current document instance, as was previously described above with reference to block 720. Control then continues to block 725, as previously described above.

If the determination at block 705 is false, then the upgrade rule 345 for the current document type definition does indicate an automatic upgrade, so control continues to block 745 where the controller 170 sends a message to the client that instructs the client to manually upgrade the document instances 160 for the current document type definition to make them compatible with the change to the schema 410. In an embodiment, the message may include the upgrade transformation 435 and the schema 410 or the portion of the schema 410 that was changed. In various embodiments, the message may take the form of a response to the promotion action, an email, an instant message, a record written to a log, or any other appropriate notification technique. Control then continues to block 799 where the logic of FIG. 7 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A computer-implemented method comprising:

finding an upgrade rule associated with a configuration set, wherein the configuration set comprises a schema and an upgrade transformation, wherein the upgrade transformation specifies a change that was made to the schema;

finding a document associated with the upgrade rule, wherein the document comprises a lifecycle state and an element, wherein the lifecycle state indicates a state of the document, wherein the document moves through a plurality of lifecycle states as content of the document is edited within the lifecycle, and wherein the plurality of lifecycle states comprise a draft state, a reviewed state, and approved state, and an effective state;

if the upgrade rule indicates an automatic upgrade, finding a first mutability rule associated with the lifecycle state of the document and deciding whether the first mutability rule allows the document to be changed, wherein the first mutability rule is one of a plurality of mutability rules and wherein each of the plurality of lifecycle states is associated with a different of the plurality of mutability rules; and if the first mutability rule allows the document to be changed, changing the element in the document to include the change specified by the upgrade transformation.

2. The method of claim 1, further comprising:

if the first mutability rule prevents the document from being changed, creating a new document, copying the document to the new document, and changing the element in the new document to include the change specified by the upgrade transformation, wherein the new document comprises an initial lifecycle state.

3. The method of claim 1, further comprising:

adding the configuration set to an operational environment in response to a promote action.

4. The method of claim 3, wherein the changing further comprises:

changing the element at a time specified by the upgrade rule.

5. The method of claim 4, wherein the time comprises the time of a first access of the document after the adding.

6. The method of claim 4, wherein the time comprises the time of the adding.

7. The method of claim 3, further comprising:

if the upgrade rule indicates a manual upgrade, sending a message to a client that sent the promote action, wherein the message comprises an instruction to manually change the element in the document.

8. The method of claim 7, wherein the message further comprises the upgrade transformation.

9. A storage medium encoded with instructions, wherein the instructions when executed comprise:

receiving a promote action and an identifier of a configuration set, wherein the configuration set comprises a schema and an upgrade transformation, wherein the upgrade transformation specifies a change that was made to the schema, wherein the schema describes a format of the document;

finding a document type definition associated with the configuration set, wherein the document type definition comprises an upgrade rule;

finding a document associated with the document type definition, wherein the document comprises a lifecycle state and an element, wherein the lifecycle state indicates a state of the document, wherein the document moves through a plurality of lifecycle states as content of the document is edited within the lifecycle, and wherein the plurality of lifecycle states comprise a draft state, a reviewed state, an approved state, and an effective state;

if the upgrade rule indicates an automatic upgrade, finding a first mutability rule associated with the lifecycle state of the document and deciding whether the first mutability rule allows the document to be changed, wherein the first mutability rule is one of a plurality of mutability rules and wherein each of the plurality of lifecycle states is associated with a different of the plurality of mutability rules; and if the first mutability rule allows the document to be changed, changing the element in the document to include the change specified by the upgrade transformation.

10. The storage medium of claim 9, further comprising:

if the first mutability rule prevents the document from being changed, creating a new document, copying the document to the new document, and changing the element in the new document to include the change specified by the upgrade transformation, wherein the new document comprises an initial lifecycle state.

11. The storage medium of claim 9, further comprising:

adding the configuration set to an operational environment in response to the promote action.

12. The storage medium of claim 11, wherein the changing further comprises:

changing the element at a time specified by the upgrade rule.

13. The storage medium of claim 12, wherein the time comprises the time of a first access of the document after the adding.

14. The storage medium of claim 12, wherein the time comprises the time of the adding.

15. The storage medium of claim 9, further comprising:

if the upgrade rule indicates a manual upgrade, sending a message to a client that sent the promote action, wherein the message comprises an instruction to manually change the element in the document, wherein the message further comprises the upgrade transformation.

16. A method for configuring a computer, comprising:

configuring the computer to receive a promote action and an identifier of a configuration set, wherein the configuration set comprises a schema and an upgrade transformation, wherein the upgrade transformation specifies a change that was made to the schema, wherein the schema describes a format of the document;

configuring the computer to find a document type definition associated with the configuration set, wherein the document type definition comprises an upgrade rule;

configuring the computer to find a document associated with the document type definition, wherein the document comprises a lifecycle state and an element, wherein the lifecycle state indicates a state of the document, wherein the document moves through a plurality of lifecycles states as content of the document is edited within the lifecycle, and wherein the plurality of lifecycle states comprise a draft state, a reviewed state, an approved state, and an effective state;

configuring the computer to, if the upgrade rule indicates an automatic upgrade, find a first mutability rule associated with the lifecycle state of the document and decide whether the first mutability rule allows the document to be changed, wherein the first mutability rule is one of a plurality of mutability rules and wherein each of the plurality of lifecycle states is associated with a different of the plurality of mutability rules;

configuring the computer to, if the first mutability rule allows the document to be changed, change the element in the document to include the change specified by the upgrade transformation; and configuring the computer to, if the first mutability rule prevents the document from being changed, create a new document, copy the document to the new document, and change the element in the new document to include the change specified by the upgrade transformation at a time specified by the upgrade rule, wherein the new document comprises an initial lifecycle state.

17. The method of claim 16, further comprising:
configuring the computer to add the configuration set to an operational environment in response to the promote action.

18. The method of claim 17, wherein the time comprises the time of a first access of the document after the add of the configuration set to the operational environment.

19. The method of claim 17, wherein the time comprises the time of the add of the configuration set to the operational environment.

20. The method of claim 16, further comprising:
configuring the computer to, if the upgrade rule indicates a manual upgrade, send a message to a client that sent the promote action, wherein the message comprises an instruction to manually change the element in the document, wherein the message further comprises the upgrade transformation.

* * * * *